Oct. 30, 1934.     R. WISHON     1,979,060
CLUTCH
Filed Feb. 25, 1932     3 Sheets-Sheet 2
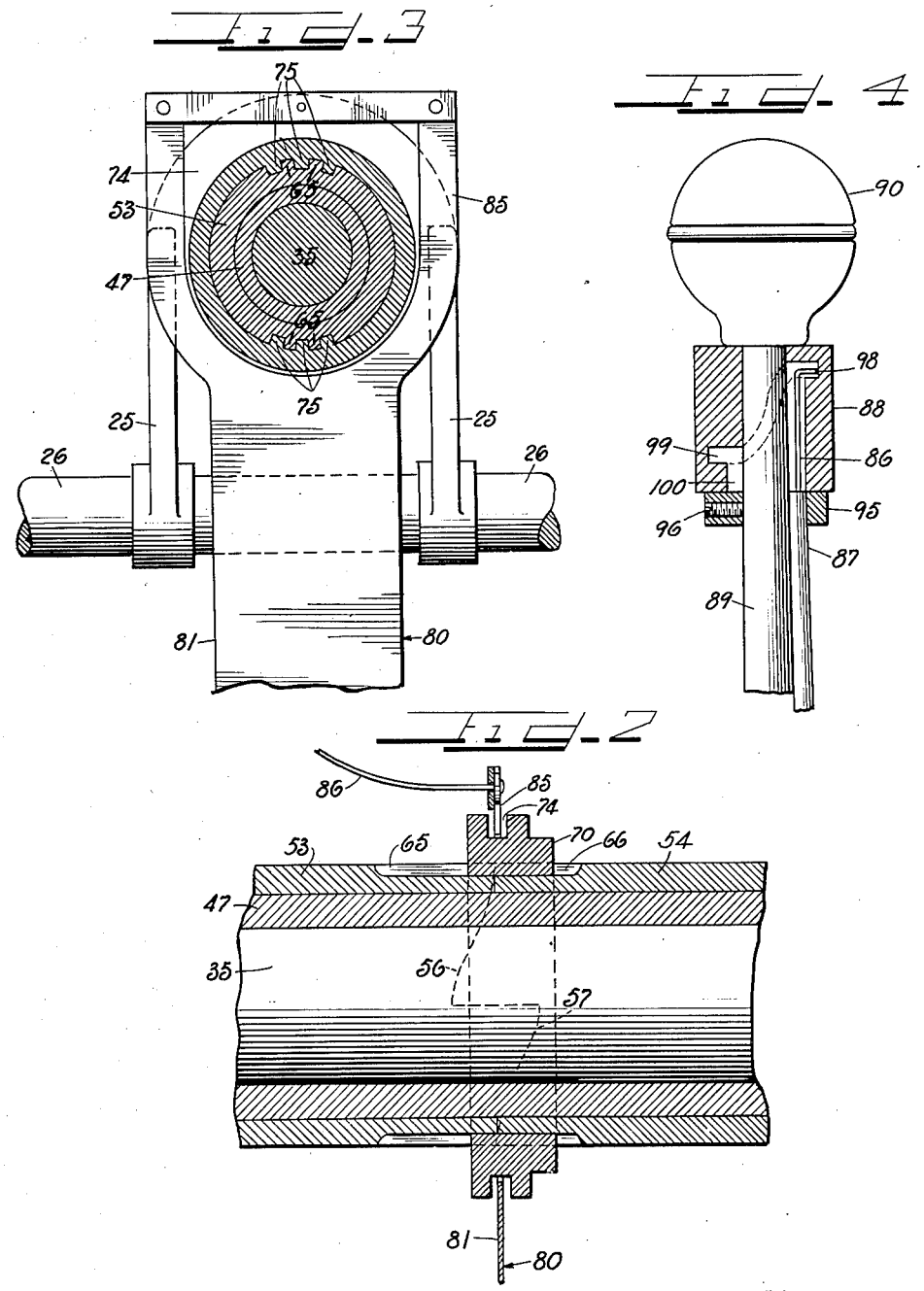

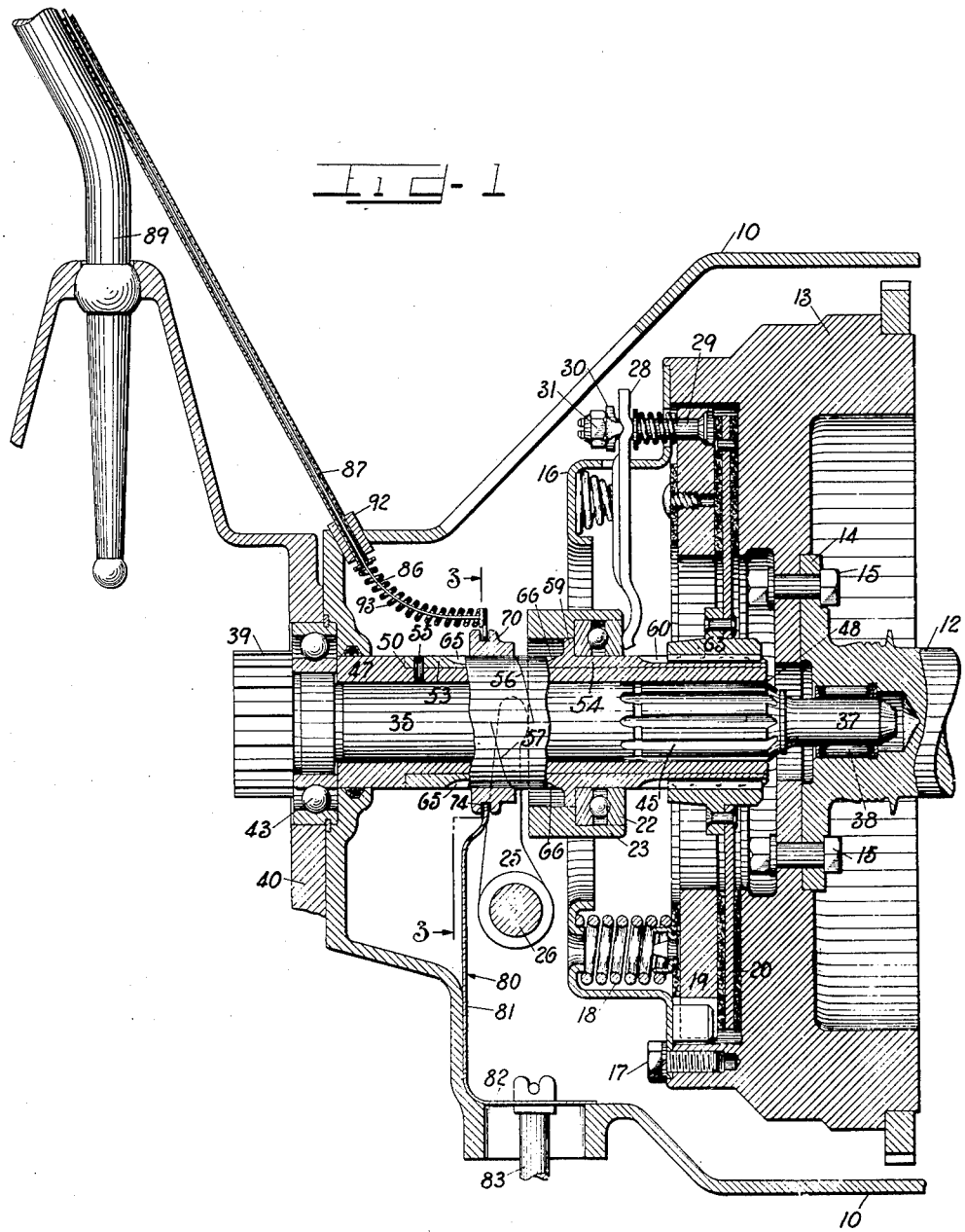

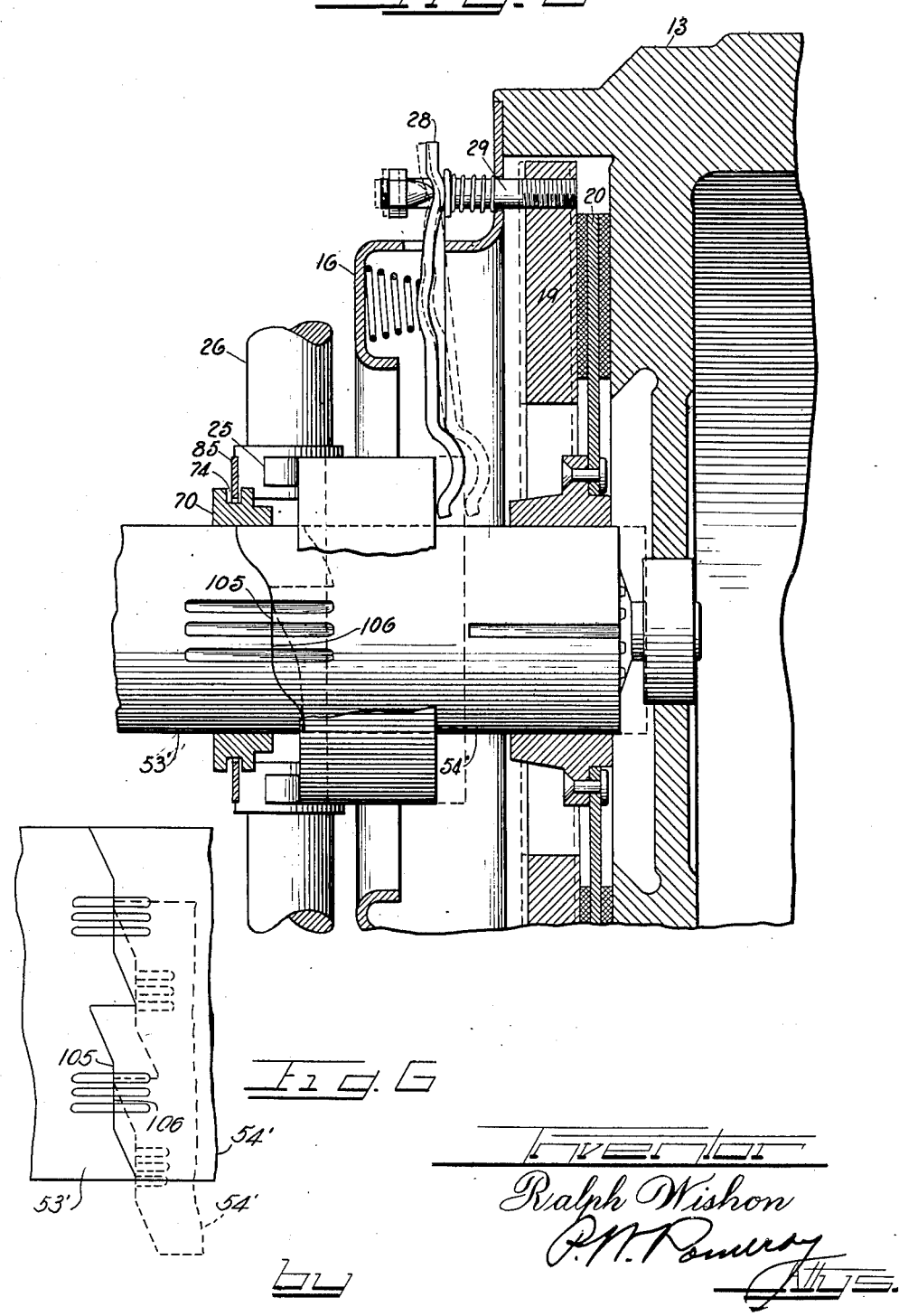

Patented Oct. 30, 1934

1,979,060

UNITED STATES PATENT OFFICE 1,979,060

CLUTCH

Ralph Wishon, Chicago, Ill., assignor to Free Wheeling Patents Corporation, South Bend, Ind., a corporation of Delaware Application February 25, 1932, Serial No. 595,069

16 Claims. (Cl. 192—48)

This invention relates to an automatic clutch control for a motor vehicle, and has for its principal object the provision of means for automatically disengaging the vehicle clutch whenever the speed of the vehicle exceeds the speed of the motor, to permit the vehicle to run free under its own momentum, or free-wheel.

A further object is the provision of means of the character described, including a lock mechanism by means of which the overrunning or free wheeling of the vehicle relative to the motor may be permitted, or prevented at the will of the operator.

A still further object is the provision of means of the character described which will in no way interfere with the normal operation of the vehicle clutch.

It is also an object to provide a device of the character described which is economical to manufacture, easy to install and which will not readily get out of order in use.

Other objects and advantages will appear as the description proceeds.

The accompanying drawings illustrate one mechanical embodiment of the idea of this invention and one slight modification thereof. The drawings however, are not to be taken as limiting the invention, the scope of which is to be measured entirely by the scope of the subjoined claims.

In the drawings:

Figure 1 is a vertical sectional view through a motor vehicle clutch and clutch casing showing the device of this invention as applied to the vehicle clutch.

Figure 2 is a sectional view on an enlarged scale of a portion of the device of the invention as illustrated in Figure 1.

Figure 3 is a cross sectional view on the line 3—3 of Figure 1, looking in the direction of the arrows.

Figure 4 is a view of the top of the gear shift lever, the bottom portion of which is illustrated in Figure 1, showing in section a manual control for the device of this invention applied thereto.

Figure 5 is a view substantially similar to Figure 1 showing a modified form of the device of this invention in elevation.

Figure 6 is a development of the cam surfaces illustrated in Figure 5.

Referring to the drawings in detail, and particularly to Figure 1, the numeral 10 indicates the clutch casing or housing of an automotive vehicle. The numeral 12 indicates the end of a motor crankshaft extending from the rear end of the motor and attached to a flywheel 13 by means of the flange 14 and bolts 15. The numeral 16 indicates a clutch spring cover case secured to the flywheel 13 by means of stud bolts 17. Within the cover case 16 is a plurality of coil springs 18 which bear against a pressure plate 19 which in turn bears against a clutch driven element 20 to compress the driven element 20 between the pressure plate 19 and the flywheel 13 to form a driving connection through the clutch.

The clutch release mechanism comprises a thrust bearing 22 held within a throw-out collar 23 which is actuated by a throw-out fork 25 secured to a shaft 26, one end of which is secured to the vehicle clutch pedal, not shown. The thrust bearing 22 bears against the inner end of a plurality of throw-out levers 28 fulcrumed on the casing 16 and having their outer ends apertured to receive bolts 29 secured in the pressure plate 19. Washers 30 and nuts 31 on the outer ends of these bolts bear against the outer ends of the levers 28 to operatively connect the levers with the pressure plate 19.

It will be apparent from this description that actuation of the throw-out fork 25 by the shaft 26 to move the thrust bearing and collar 23 forwardly of the vehicle will move the throw-out levers 28 to pull the pressure plate 19 backwardly relative to the vehicle to release the clutch driven member 20 from compression between the pressure plate 19 and the flywheel 13, to release the clutch.

A clutch shaft 35 extends axially through the clutch spring casing 16, the pressure plate 19, the clutch driven element 20 and the flywheel 13, and has a reduced end 37 journaled in the rear end of the crankshaft 12 by means of the anti-friction rollers 38. This clutch shaft 35 carries upon the rear end thereof a driving pinion 39 situated within the transmission housing 40, and is journaled in the transmission housing by means of a suitable anti-friction bearing 43. The shaft 35 is provided with splines 45 at the forward end thereof adjacent to the reduced end 37 and a sleeve 47 is fitted upon the shaft and has splines 48 interiorly of the forward end thereof cooperating with the splines 45 to render the sleeve non-rotatable relative to the shaft 35. This sleeve 47 completely surrounds the shaft 35 and extends from the forward surface of the transmission housing 40 to substantially the reduced end 37. Exteriorly the sleeve 47 is reduced from a shoulder 50 adjacent to the rear end thereof to the front end of the sleeve and separate sleeves 53 and 54 are mounted upon this reduced portion, the thickness of these separate sleeves being equal to the depth of the shoulder 50 so that the mechanism comprising the sleeve 47 and sleeves 53 and 54 is substantially in the form of a smooth cylinder. The sleeve 53 is materially shorter than the sleeve 54 and is non-rotatably secured to the sleeve 47 by means of a radial pin 55. The sleeve 54 is rotatably mounted upon the sleeve 47 and the adjacent ends of sleeves 53 and 54 are provided with mating cam surfaces 56 and 57 respectively, so shaped that the sleeve 54 will drive the sleeve 53 in one direction of rotation but the sleeve 53 will move the sleeve 54 axially of the sleeve 47 when the speed of the sleeve 53 exceeds the speed of the sleeve 54 in the same direction of rotation. The sleeve 54 is provided with a radial flange 59 bearing against the rear of the thrust bearing 22 and at its forward end is provided with splines 60 which are axially slidable but non-rotatable within the splined hub 63 of the clutch driven element 20.

The sleeves 53 and 54 are provided with longitudinal slots 65 and 66 at their adjacent ends, said slots extending parallel to the axis of the sleeves and the slots on one sleeve matching with the slots on the other sleeve, when the two sleeves are in such relative positions that the sleeve 54 is driving the sleeve 53. A collar 70 having a circumferential groove 74 exteriorly and radial splines 75 internally thereof, as illustrated in Figure 3, is slidably mounted upon the sleeves 53 and 54 in the zone of the slots 65 and 66, and is movable axially of the sleeves 53 and 54 from one to the other of two operative positions. In one position the splines 75 lie wholly within the slots in the sleeve 53, whereby the sleeves are free to rotate relative to each other and in the other operative position splines 75 lie partly within the slots in the sleeve 53 and partly within the slots in the sleeve 54 whereby the two sleeves are non-rotatably locked together. A flat spring member 80 having a vertical portion 81 and an angularly bent end portion 82 secured in the bottom of the clutch casing 10 by means of a pin 83, has a forked upper portion 85 surrounding the collar 70 and lying within the groove 74. A wire 86 is secured to the top of this member 80 and extends through a tube 87 from a point just within the rear upper part of the clutch casing 10 to a member 88 rotatably mounted on the gear shift lever 89 immediately below the shift knob 90, as illustrated in Figure 4. The tube 87 is secured within the clutch casing 10 by a bushing 92 and a coil spring 93 extends from the inner end of the tube 87 to the top of the spring member 80 and is coiled about the end of the wire 86 which extends from the tube to the member 80. This coil spring 93 tends to thrust the upper end of the spring member 80 away from the rear end of the clutch casing 10.

Referring to Figure 4, it will be observed that the upper end of the tube 87 extends into a collar 95 rigidly mounted on the gear shift lever 89 by means of a set screw 96. This collar 95 also serves to hold the member 88 in position against the bottom of knob 90. It will be observed that the tube 87 ends at the upper surface of the member 95 but the wire 86 extends upwardly into the member 88 and has a bent-over end portion 98 fitting within a spiral groove 99 provided interiorly of the member 88. An enlarged bore 100 extends from the bottom of the groove 99 to the bottom of the member 88 to accommodate the vertical portion of the wire 86 extending into the member 88.

It will be apparent from this description that rotation of the member 88 upon the gear shift lever 89 will serve to move the wire 86 longitudinally through the tube 87.

In the preferred form of the invention illustrated in Figure 1, it will be observed that the cam surfaces 56 and 57 are straight inclined surfaces extending around the circumference of the sleeves 53 and 54. In the modified form of the device illustrated in Figure 5, I have provided these cam surfaces with intermediate flat portions 105 and 106, for a purpose to be presently described. Otherwise the structure illustrated in Figure 5 is the same as that illustrated in Figure 1.

The operation of the device is as follows:

Assuming that the motor is driving the vehicle, in which case the sleeve 54 will be driving the sleeve 53 through the cam ends 57 and 56 respectively, and that the collar 70 is in that operative position in which the sleeves are free to rotate relative to each other in one direction; if now the speed of the motor be reduced so that the vehicle tends to overrun the engine, the sleeve 53 will be rotated relative to the sleeve 54 and will cause the sleeve 54 to move forwardly axially of the sleeve 47. The splines 60 will slide through the splined hub 63 of the clutch driven element 20 and the radial shoulder 59 on the sleeve 54 will press against the thrust bearing 22 and move the thrust bearing forwardly against the clutch throw-out levers 28. This will actuate the clutch throw-out levers to move the pressure plate 19 backwardly from the clutch driven element 20 and release the driven element 20 from its compression between the pressure plate 19 and the flywheel 13. This will release the clutch and permit the clutch driven element 20 to overrun the flywheel 13 and the pressure plate 19, thereby permitting the vehicle to free wheel under its own momentum relative to the motor. If now the speed of the motor be increased to a speed exceeding the speed of rotation of the clutch shaft 35, the engine clutch and parts rotatable therewith will permit the throw-out levers 28 to move the thrust bearing 22 rearwardly so that the springs 18 will force the pressure plate 19 forwardly again compressing the clutch driven member 20 between the pressure plate 19 and the flywheel 13 to establish a driving connection through the engine clutch. At the same time the driving connection is made through the engine clutch, the sleeve 54 will be rotated due to its connection with the clutch driven element 20 until a driving relation is established between the clutch faces on the cams 56 and 57.

When it is desired to prevent or lock-out this free wheeling action of the vehicle relative to the motor, the member 88 is rotated about the shift lever 89 to thrust the wire 86 downwardly relative to the tube 87. This action moves the lower end of the wire forwardly relative to the sleeves 53 and 54 carrying with it the upper end of the spring member 80 and the collar 70. If the sleeves 53 and 54 be in such position that the sleeve 54 is driving the sleeve 53 and the slots 65 and 66 are in meshing relation, the forward end of the radial splines 75 on the collar 70 will then move from the slots 65 into the slots 66 thereby locking the sleeves 53 and 54 together, rendering the sleeve 54 non-rotatable relative to the sleeve 53 and consequently non-slidable relative to the sleeve 47 whereby a positive or conventional drive is obtained through the vehicle clutch.

In the modified form of the invention illustrated in Figure 5, the sleeves 53' and 54' are provided in their adjacent ends with cams in the form of a series of serrations, each serration having one surface parallel to the axis of the sleeve and the other surface extending spirally around the sleeve from the bottom of the parallel surface to the adjacent end of the sleeve. Each of these sloping cam surfaces is provided with an intermediate flat portion and as the sleeve 53' rotates relative to the sleeve 54' as the vehicle overruns the motor, the relative motion between the cam surfaces 105 and 106 will thrust the sleeve 54' ahead until a portion of the cam 105 or 106 rides upon a flat portion of the other, in which position the clutch will be released and there will be little or no tendency for the cam surfaces to slip backward relative to each other to cause the clutch to chatter when the vehicle is free wheeling. The cam surfaces 105 and 106 are so designed, however, that there will always be a small amount of friction between the clutch driven element 20 and the flywheel 13 or the pressure plate 19 so that immediately upon the speed of the motor being increased to drive the vehicle the sleeve 54' will be rotated relative to the sleeve 53' to permit the clutch to come into full engagement.

Having now described my invention and the advantages and operations thereof so that others skilled in the art may clearly understand the same, what I desire to secure by Letters Patent is as follows:

1. In combination with the clutch of a motor vehicle, a shaft operatively connecting said clutch with the vehicle transmission, a sleeve non-rotatably mounted on said shaft, a second sleeve rotatably and slidably mounted on said first sleeve, means operatively connecting said second sleeve with said clutch, means inter-acting between said two sleeves whereby said second sleeve will drive said first sleeve when power is being transmitted from the motor to the vehicle, and whereby said second sleeve will be actuated to release said clutch when the speed of the vehicle tends to exceed the speed of the motor, and a third sleeve slidably mounted on one of said first mentioned sleeves manually actuatable to lock said first two sleeves together and render said last named means ineffective to release said clutch.

2. In combination with the clutch of a motor vehicle, a shaft operatively connecting said clutch with the vehicle transmission, a sleeve non-rotatably mounted on said shaft, a reduced portion on said sleeve, a second sleeve rotatably and slidably mounted on said reduced portion, a serrated surface adjacent to said reduced portion providing a one-way driving cam on said first sleeve, a corresponding cam on the adjacent end of said second sleeve, whereby said second sleeve will drive said first sleeve when power is being transmitted from the motor to the vehicle, and whereby said second sleeve will be moved axially of said first sleeve to release said clutch when the speed of the vehicle tends to exceed the speed of the motor, and manual control means for locking said sleeves together.

3. In combination with the clutch of a motor vehicle, a shaft operatively connecting said clutch with the vehicle transmission, a sleeve non-rotatably mounted on said shaft, a second sleeve rotatably and slidably mounted on said first sleeve, means operatively connecting said second sleeve with said clutch, a set of inclined cam surfaces on said first named sleeve, a set of corresponding inclined cam surfaces on the adjacent end of said second sleeve, whereby said second sleeve will drive said first sleeve when power is being transmitted from the motor to the vehicle, and whereby said second sleeve will be actuated to release said clutch when the speed of the vehicle tends to exceed the speed of the motor, and manual control means for locking said sleeves together to render said cam surfaces ineffective to release said clutch.

4. In combination with the clutch of a motor vehicle, a shaft operatively connecting said clutch with the vehicle transmission, a sleeve non-rotatably mounted on said shaft, a second sleeve rotatably and slidably mounted on said first sleeve, a third sleeve fixedly mounted on said first sleeve, said second and third sleeves being mounted in end to end relation on said first sleeve, means operatively connecting said second sleeve with said clutch, cam surfaces on one end of said third sleeve, corresponding cam surfaces on the adjacent end of said second sleeve, whereby said second sleeve will drive said third sleeve and said first sleeve when power is being transmitted from the motor to the vehicle, and whereby said second sleeve will be actuated to release said clutch when the speed of the vehicle tends to exceed the speed of the motor, and manual control means for locking said second and said third sleeves together to render said cam surfaces ineffective to actuate said second sleeve to release said clutch.

5. In combination with the clutch of a motor vehicle, a shaft operatively connecting said clutch with the vehicle transmission, a sleeve non-rotatably mounted on said shaft, a second sleeve rotatably and slidably mounted on said first sleeve, a third sleeve fixedly mounted on said first sleeve, a driven plate for said clutch, a splined connection slidably but non-rotatably connecting said second sleeve to said driven plate, cam means inter-acting between the adjacent ends of said second sleeve and said third sleeve whereby said second sleeve will drive said third sleeve when power is being transmitted from the motor to the vehicle, and whereby said second sleeve will be actuated to release said driven plate from frictional contact with other elements of said clutch when the speed of the vehicle tends to exceed the speed of the motor, and manual control means for rendering said cam means ineffective to actuate said second sleeve to release said driven plate.

6. In combination with the clutch of a motor vehicle, a shaft operatively connecting said clutch with the vehicle transmission, a sleeve non-rotatably mounted on said shaft, a second sleeve rotatably and slidably mounted on said first sleeve, a third sleeve fixedly mounted on said first sleeve, said second and third sleeves being mounted in end to end relation on said first sleeve, a pressure plate, a driven plate, a thrust bearing for actuating said pressure plate to release said driven plate from frictional contact, cam means inter-acting between the adjacent ends of said second sleeve and said third sleeve, whereby said second sleeve will drive said third sleeve when power is being transmitted from the motor to the vehicle, and whereby said second sleeve will be moved longitudinally of said first sleeve when the speed of the vehicle tends to exceed the speed of the motor, a splined connection slidably but non-rotatably connecting said second sleeve to said driven plate, a radial flange on said second sleeve bearing against said thrust bearing to actuate said thrust bearing to release said driven plate from frictional contact with other elements of said clutch, and manual control means for locking said sleeves together to render said second sleeve ineffective to release said driven plate.

7. In combination with the clutch of a motor vehicle, a shaft operatively connecting said clutch with the vehicle transmission, a sleeve non-rotatably mounted on said shaft, a second sleeve rotatably and slidably mounted on said first sleeve, a third sleeve fixedly mounted on said first sleeve, said second and third sleeves being mounted on said first sleeve in end to end relation, means operatively conecting said second sleeve with said clutch, cams upon the adjacent ends of said second and third sleeves, whereby said second sleeve will drive said third sleeve when power is being transmitted from the motor to the vehicle, and whereby said second sleeve will be actuated to release said clutch when the speed of the vehicle tends to exceed the speed of the motor, said second and third sleeves having longitudinally extending grooves therein in the zone of said cam surfaces, said grooves being adapted to match in a certain relative position of said sleeves, a collar having radial splines in the inner surface thereof, manually movable into one position to release said second sleeve from said third sleeve, and manually movable into another position to lock said sleeves together against relative rotation, whereby said second sleeve is rendered ineffective to release said clutch.

8. In combination with a clutch of a motor vehicle, a shaft operatively connecting said clutch with the vehicle transmission, a sleeve non-rotatably mounted on said shaft, a second sleeve rotatably and slidably mounted on said first sleeve, a third sleeve fixedly mounted on said first sleeve, said second and third sleeves being mounted on said first sleeve in end to end relation, means operatively connecting said second sleeve with said clutch, cams upon the adjacent ends of said second and said third sleeves, whereby said second sleeve will drive said third sleeve when power is being transmitted from the motor to the vehicle and whereby said second sleeve will be actuated to release said clutch when the speed of the vehicle tends to exceed the speed of the motor, said second and third sleeves having longitudinally extending grooves therein in the zone of said cam surfaces, said grooves being adapted to match in a certain relative position of said sleeves, a collar slidable on said sleeves having radial splines on the inner surface thereof adapted to cooperate with said grooves to lock said sleeves together, and having a circumferential groove in the outer surface thereof, a flat spring member having one end secured to the clutch casing and having its other end provided with a yoke surrounding said collar and fitting into said groove, and a manual control element connected to the yoke end of said frame, whereby said collar may be moved to release said second and third sleeves for relative rotation or may be moved to lock said sleeves together to render said second sleeve ineffective to release said clutch.

9. In combination with the clutch of a motor vehicle, a shaft operatively connecting said clutch with the vehicle transmission, a sleeve non-rotatably mounted on said shaft, a second sleeve rotatably and slidably mounted on said first sleeve, a third sleeve fixedly mounted on said first sleeve, said second and third sleeves being mounted on said sleeve in end to end relation, cams on the adjacent ends of said second sleeve and said third sleeve, said cams including a flat space between the ends thereof whereby the flat space in the cam on the second sleeve will ride upon the flat space in the cam on the third sleeve when the second sleeve rotates relative to the third sleeve, to hold the second sleeve displaced longitudinally along said first sleeve to hold said clutch in released position.

10. A machine element comprising an inner sleeve and a pair of outer sleeves mounted in end to end relation upon said inner sleeve, one of said outer sleeves being fixedly secured to said inner sleeve and the other of said outer sleeves being slidable and rotatable relative thereto, an inter-engaging cam surface between the adjacent ends of said two outer sleeves comprising, a series of serrations having one side parallel with the axis of said sleeve and the other side inclined thereto and extending spirally around said sleeve, said inclined surfaces each having a flat space therein whereby the movable sleeve will be held in spaced relation to the fixed sleeve when the extension of each set of cams rides upon the flat spaces in the inclined surfaces of the opposite sets.

11. In combination with a driving clutch having drive and driven elements and throwout means therefor, a pair of axially aligned sleeves having interacting surfaces therebetween, one of said sleeves being operatively connected with said clutch driven element and adapted to be driven thereby to provide a one-way drive to said other sleeve through said interacting surfaces, means to permit axial movement of one of said sleeves to operate said throwout means and permit overrun of said sleeves relative to said clutch driving element, and a shiftable member supported by one of said sleeves and movable into engagement with said other sleeve to provide a two-way drive.

12. In combination with a driving clutch having drive and driven elements, a pair of axially aligned members having mating cam surfaces, one of said members being non-rotatably and slidably connected with said clutch driven element and adapted to be driven thereby to provide a one-way drive to said other member through said cam surfaces, said one member being axially movable to disengage said clutch drive and driven elements and permit overrun of said members relative to said clutch driving element, and a shiftable member supported by one of said members and movable into engagement with the other member to provide a two-way drive.

13. In combination with a driving clutch having drive and driven elements throwout means therefor and a clutch shaft, a pair of axially aligned sleeves having mating cam surfaces supported by said clutch shaft, one of said sleeves being operatively connected with said clutch driven element and adapted to be driven thereby to provide a one-way drive to said other sleeve through said cam surfaces, said one sleeve being axially movable to operate said throwout means and permit overrun of said sleeves and clutch shaft relative to said clutch driving member, and means supported by one of said sleeves and movable into engagement with said other sleeve to provide a two-way drive.

14. In combination with a driving clutch having drive and driven elements, a sleeve operatively connected with said clutch driven element, a second sleeve in axial alignment with said first sleeve, means interacting between said sleeves to provide a one-way drive to said second sleeve from said clutch driven element, means to permit axial movement of one of said sleeves to disengage said drive and driven elements and permit overrun of said sleeves relative to said clutch driving element, and means movable into engagement with both of said sleeves to provide a two-way drive.

15. In combination with a driving clutch having drive and driven elements and throwout means therefor, a member non-rotatably and slidably connected with said clutch driven element, a second member in axial alignment with said first member, means interacting between said members to provide a one-way drive to said second member from said clutch driven element, said first member being axially movable to operate said clutch throwout means to provide overrun of said members relative to said clutch drive member, and means movable into engagement with both of said members to provide a two-way drive.

16. In a clutch, driving and driven members, a sleeve on said driven member, a clutch disk slidably splined on said sleeve and adapted to be engaged with said driving member, and means for disengaging said clutch disk from said driving member to release said clutch, said sleeve having a driving connection with said driven member operable by the relative rotary movement of said sleeve and said driven member to shift said sleeve endwise into engagement with the clutch disk disengaging means to actuate the latter.

RALPH WISHON.